United States Patent
Muramatsu et al.

(10) Patent No.: US 7,050,838 B1
(45) Date of Patent: May 23, 2006

(54) PORTABLE TERMINAL DEVICE WITH POWER SAVING INFORMATION PROCESSING

(75) Inventors: Fumihiro Muramatsu, Shizuoka (JP); Takashi Sugihara, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/351,521

(22) Filed: Jul. 12, 1999

(30) Foreign Application Priority Data

Jul. 13, 1998 (JP) .......................................... 10-212002

(51) Int. Cl.
*H04B 1/38* (2006.01)
*H04M 1/00* (2006.01)

(52) U.S. Cl. ...................... 455/574; 455/556; 455/343

(58) Field of Classification Search ................ 455/557, 455/556, 575, 90, 522, 571, 572, 573, 574, 455/343

See application file for complete search history.

(56) References Cited

U.S. PATENT DOCUMENTS

| | | | | |
|---|---|---|---|---|
| 5,604,928 A | * | 2/1997 | Hamano et al. | 455/310 |
| 5,630,224 A | * | 5/1997 | Swail | 455/296 |
| 5,765,113 A | * | 6/1998 | Russo et al. | 455/557 |
| 5,777,991 A | * | 7/1998 | Adachi et al. | 455/557 |
| 5,930,719 A | * | 7/1999 | Babitch et al. | 455/462 |
| 6,163,711 A | * | 12/2000 | Juntunen et al. | 455/557 |
| 6,205,343 B1 | | 3/2001 | Montgomery, Jr. | |
| 6,272,359 B1 | * | 8/2001 | Kivela et al. | 455/567 |
| 6,463,299 B1 | * | 10/2002 | Macor | 455/556 |

FOREIGN PATENT DOCUMENTS

| | | |
|---|---|---|
| CN | 1166770 A | 12/1997 |
| EP | 0 601 820 A1 | 6/1994 |
| WO | WO 92/15073 | 9/1992 |
| WO | WO 93/25955 | 12/1993 |

\* cited by examiner

*Primary Examiner*—Nay Maung
*Assistant Examiner*—Tilahun Gesesse
(74) *Attorney, Agent, or Firm*—Pearne & Gordon LLP

(57) ABSTRACT

There is provided a portable information terminal having a built-in radio communications device which minimizes a drop in the voltage of a battery and diminishes the operation threshold voltage of the portable information terminal, thereby lengthening the operatable time of the terminal. In the portable information terminal, when a radio communications section is in a transmission state, a microprocessor of an interface and a microprocessor of an information processing section are brought into a hold state, thereby deactivating the interface and the information processing section. As a result, the operating current required during transmission can be minimized. When the radio communications section is not in a transmission state, the information processing section and the interface are activated. Even when the radio communications section is in a voice communication state and when information is not input to the information processing section for a given period of time, the information processing section and the interface are deactivated. A voltage drop due to internal resistance of the battery is diminished by distributing or reducing the electric current dissipated by operation, in accordance with operating conditions. Consequently, the portable information device can be operated even when the voltage of the battery drops, thus lengthening the operatable time.

3 Claims, 4 Drawing Sheets

PORTABLE TERMINAL DEVICE WITH POWER SAVING INFORMATION PROCESSING

BACKGROUND OF THE INVENTION

1. Field of the Invention

The present invention relates to a portable information terminal having a built-in radio communications device, and more particularly, to a portable information terminal having a built-in radio communications device such as a portable cellular phone.

2. Description of the Background Art

FIG. 3 shows the configuration of a conventional portable information terminal having a built-in radio communications device. The conventional portable information device (a) with a built-in radio communications device [hereinafter referred to simply as an "information device (a)"] comprises a radio communications section (a2), an interface section (a3), an information processing section (a4), and a secondary battery (a8). The radio communications section (a2) has TDMA (time division multiple access)-type radio communications means which transmits and receives data by use of a time division technique. This radio communications section (a2) transmits and receives data by way of an antenna (a1), and the TDMA-type radio communications means comprises a radio circuit (a9) and a radio control circuit (a10). The TDMA-type radio communications means employs a known technique like that employed by a portable digital cellular (PDC) telephone, and hence its explanation is omitted here. The radio control circuit (a10) comprises an unillustrated microprocessor, memory, an I/O control circuit, a serial communications circuit, an audio processing circuit, and a power supply circuit. The radio control circuit (a10) effects wireless control of TDMA processing, communication with an interface, transmission signal processing for converting a voice signal input by way of a microphone (a11) into audio data, and received signal processing for converting the thus-received audio data into an analog audio signal and outputting the thus-converted analog audio signal to a receiver (a12).

The interface (a3) comprises a microprocessor, memory, a serial communications circuit, a parallel communications circuit, and a power supply circuit, which are not illustrated in the drawing. The interface (a3) fulfills a modem function for modulating and demodulating e-mail data or fax data, and a data communications function for transmitting control command data used by the information processing section (a4) for controlling the radio communications section (a2). The modem function comprises encoding and compression of transmission data and decoding and expansion of received data. The e-mail data and the fax data are exchanged between the information processing section (a4) and the radio communications section (a2) by way of a non-audio data bus (a14). Further, the control command data are exchanged between the information processing section (a4) and the radio communications section (a2) by way of a control command bus (a13).

The information processing section (a4) comprises an unillustrated microprocessor, memory, a serial communications circuit, a parallel communications circuit, an I/O circuit, a character input section (a7), and a display section (a6). The character data entered by way of the character input section (a7) are edited into text data and are temporarily stored in memory. When the thus-stored text data are transmitted in the form of an e-mail message, a control command (a call-origination command) is issued for the purpose of bringing the radio communications section (a2) into a communication state. While a communications channel is established after completion of call origination processing, the text data are transmitted to the interface (a3) by way of the non-audio data bus (a14).

The e-mail message received by way of the non-audio data path (a14) is temporarily stored in memory. The thus-stored e-mail message is indicated on the display section (a6) by control operations performed by way of the character input section (a7). The information processing section (a4) serves as a human-machine interface between the operator and the radio communications section (a2). The control information about the radio communications section (a2), which is entered by way of the character input section (a7), is converted into a control command by means of a microprocessor and is transmitted to the interface (a3). As mentioned above, the information processing section (a4) embodies the human-machine interface between the operator and the radio communications section (a2), for example, transmission and receipt operations.

The voltage output from the secondary battery (a8) is supplied to the radio communications section (a2), the interface (a3), and the information processing section (a4), respectively.

The information portable terminal having a built-in radio communications device has conventionally been embodied by means of the above circuit configuration.

In the previously-described circuit configuration, at the time of transmission or reception of an e-mail message, the radio communications section (a2), the interface (a3), and the information processing section (a4) operate simultaneously. As a result, an output impedance of the secondary battery (a8) causes a great drop in output voltage. FIG. 4 shows timings (b1) at which TDMA signals are transmitted and received and voltage fluctuations (b2) occurring at the time of transmission.

Particularly, during a transmission time slot (b21), a significant voltage drop (b22) arises from a load current required by a transmission operation of the radio communications section (a2) and a load current required by operations of the interface (a3) and the information processing section (a4). Because of the voltage drop (b22), the output voltage of the secondary battery (a8) fails to become stable in the vicinity of the final voltage thereof, thus causing an operation failure. Such an operation failure has conventionally been prevented by increasing the operation threshold voltage of the information device (a) to such a voltage as not to induce an operation failure. However, this method also raises a problem of shortening the operation time of the information device (a).

As mentioned above, the radio communications section (a2) has conventionally been operated by means of the information processing section (a4). While the radio communications section (a2) remains in a voice communication state, the information processing section (a4) awaits entry of operation information. To this end, the information processing section (a4) must be held in an operating state. Accordingly, the electric current dissipated by operation in the voice communication state increases, which in turn shortens the operation time.

SUMMARY OF THE INVENTION

The object of the present invention is to solve the foregoing problem in the background art and to provide a portable information terminal having a built-in radio communications device which can operate for a long period of time by distributing or diminishing the electric current dissipated through operation, in accordance with operating conditions.

To solve the problem, according to the present invention, a portable information terminal having a built-in radio communication is configured so as to deactivate an information processing section and an interface when a radio communications section is in a transmission state, as well as to activate the information processing section and the interface when the radio communications section is in a non-transmission state. Further, the portable information terminal is configured so as to deactivate the information processing section and the interface section while the radio communications section is in a voice communication state and information is not input to the information processing section for a given period of time.

By means of such a configuration, there is provided a portable information terminal having a built-in radio communications device which can operate for a long period of time by distributing or diminishing the electric current dissipated by operation, in accordance with operating conditions.

According to first aspect of the present invention, there is provided a portable information terminal having a built-in radio communications device, including: a radio communications section for performing transmission and receipt operations through use of a time-division technique, an information processing section for receiving, processing, storing, and outputting information, an interface which electrically connects the radio communications section to the information processing section and exchanges information therebetween, and a battery for supplying power to the radio communications section, the information processing section, and the interface, wherein the portable information terminal is characterized by comprising: means for deactivating the information processing section and the interface when the radio communications section is in a transmission state. During the transmission operation of the portable information terminal, only the radio communications section dissipates an electric current, thereby minimizing a drop in the output voltage of the battery. Consequently, the operation threshold voltage of the portable information terminal is also diminished.

Preferably, the portable information terminal further comprises means for controlling the radio communications section and the information processing section so as to exchange information therebetween only while the radio communications section is in a non-transmission state. Employment of such a control means yields an advantage of the ability to exchange of information between the information processing section and the radio communications section in a non-communication state even when the information processing section and the interface are deactivated during a transmission state.

Preferably, in the portable information terminal, the radio communications section has a function of exchanging audio data or non-audio data with a network. Further, the portable information terminal has means for deactivating the information processing section and the interface while the radio communications section is in a voice communication state and information is not input to the information processing section for a given period of time. The portable information terminal yields the advantage of minimizing the electric current dissipated by operation when the radio communications section is in an audio communication state and information is not input for a given period of time.

DETAILED DESCRIPTION OF THE PREFERRED EMBODIMENTS

A preferred embodiment of the present invention will be described in detail hereinbelow by reference to FIGS. 1 and 2.

A first embodiment of the present invention is directed to a portable information terminal having a built-in radio communications device which deactivates an information processing section and an interface when a radio communications section is in a transmission state; which activates the information processing section and the interface when the radio communications section is in a non-transmission state; and which deactivates the information processing section and the interface section while the radio communications section is in a voice communication state and information is not input to the information processing section for a given period of time.

Figure 1:
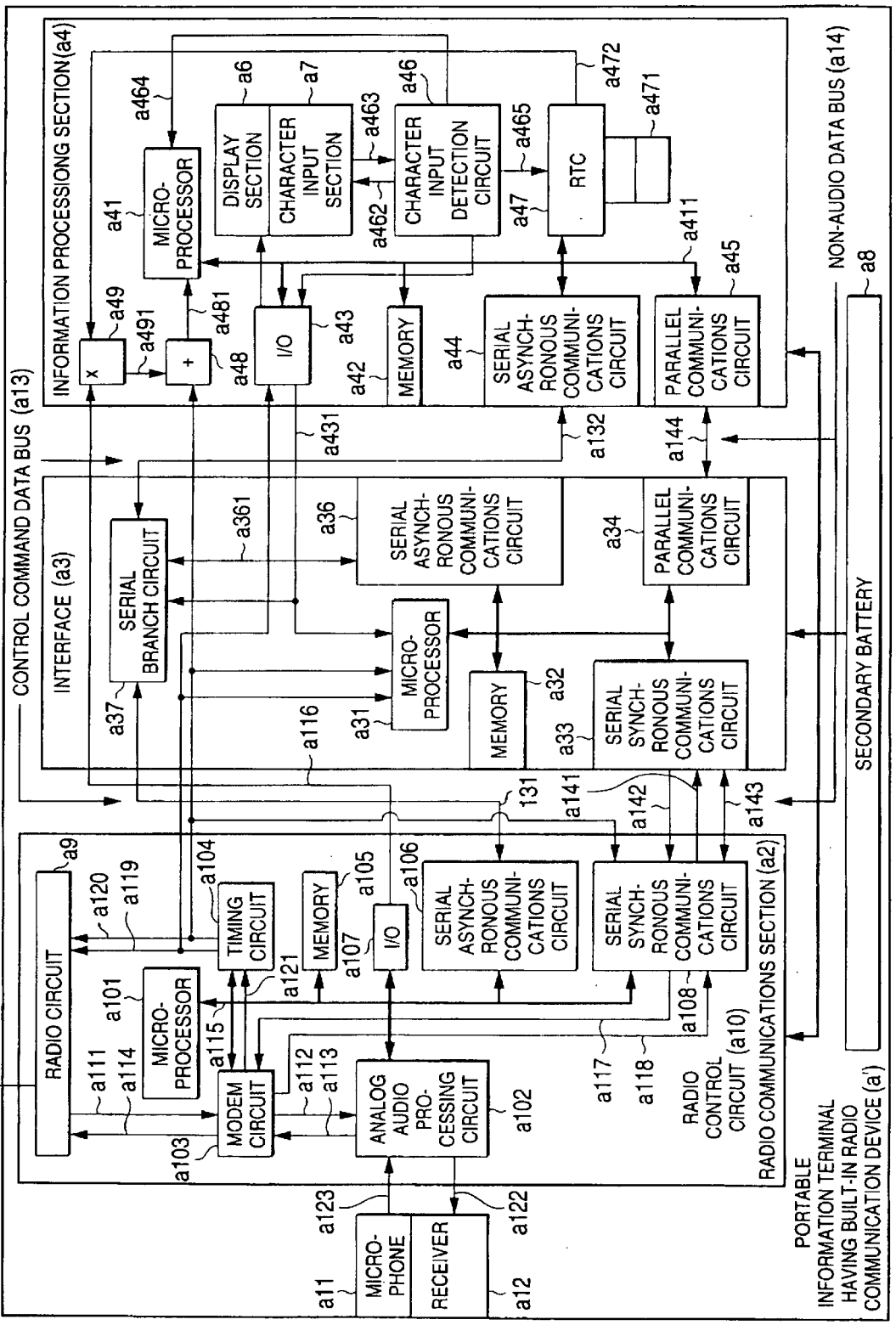
FIG. 1 is a circuit diagram showing a portable information terminal having a built-in radio communications device according to one embodiment of the present invention.

FIG. 1 is a circuit diagram showing a portable information terminal (a') with a built-in radio communications device [hereinafter referred to simply as a "terminal (a)"] according to the first embodiment of the present invention. The terminal (a') comprises a radio communications section (a2), an interface (a3), an information processing section (a4), and a secondary battery (a8). The radio communications section (a2) has TDMA (time division multiple access) radio communications means and receives and transmits data by way of an antenna (a1) according to time division technique. The TDMA-type radio communications means is embodied as a radio circuit (a9) and a radio control circuit (a10).

The TDMA-type radio communications means employs radio communications means analogous to that employed by a PDC-type digital portable cellular phone, and hence the description of the radio circuit (a9) is omitted here. The radio control circuit (a10) comprises a microprocessor (a101), an analog audio processing circuit (a102), a serial synchronous communications circuit (a108), a timing circuit (a104), memory (a105), a serial asynchronous communications circuit (a106), an I/O circuit (a107), and a modem circuit (a103). The microprocessor (a101) performs a predetermined processing operation through execution of a program stored in the memory (a105) by way of a system bus (a115).

The modem circuit (a103) demodulates digital data from a signal (a111) received by the radio circuit (a9), decodes audio data from the digital data, and transmits received audio digital data (a112) to the analog audio processing circuit (a102). Further, the modem circuit (a103) encodes transmission audio digital data (a112) received from the analog audio processing circuit (a102), modulates the thus-encoded digital data (a112) into a modulated digital signal (a114), and transmits the thus-modulated digital signal (a114) to the radio circuit (a9). In the case where the received signal (a111) corresponds to non-audio data, such as an e-mail message or fax data, the modem circuit (a103) outputs demodulated data (a117) to the serial synchronous communications circuit (a108). Further, the modem circuit (a103) modulates transmission non-audio data (a118) into the modulated digital signal (a114) and transmits the thus-modulated digital signal (a114) to the radio circuit (a9). Audio data and non-audio data are distinguished from each other by means of an instruction issued by the microprocessor (a101).

The analog processing circuit (a102) converts the received audio digital data (a112) into an analog audio received signal (a122) and transmits the thus-converted analog audio received signal (a122) to the receiver (a12). Further, the analog processing circuit (a102) converts an analog transmission audio signal (a123) received from the microphone (a11) into the transmission audio digital data (a113).

The serial synchronous communications circuit (a108) is a full-duplex synchronous communications circuit. The serial synchronous communications circuit (a108) temporarily stores the demodulated data (a117) into an unillustrated transmission register provided in the serial synchronous communications circuit (a108) and transmits the demodulated data (a117), which has been temporarily stored in the transmission register, as serial data (a141) in synchronism with a synchronous clock signal (a143) according to an instruction issued by the microprocessor (a101). Further, the serial synchronous communications circuit (a108) temporarily stores serial data (a142) into an unillustrated receiving register provided in the serial synchronous communications circuit (a108) and transmits the serial data (a142), which has been temporarily stored in the receiving register, as the transmission non-audio data (a118) in synchronism with a transmission timing signal (a120).

The timing circuit (a104) generates timing signals required for TDMA with reference to a synchronous receiving reference signal (a121) received from the modem circuit (a103); namely, the timing circuit (a104) generates a receipt timing signal (a119) and a transmission timing signal (a120).

The I/O circuit (a107) controls input and output of signals according to the instruction issued by the microprocessor (a101). When the output signal (a116) is at a high level, the I/O circuit (a107) issues a signal representing that the radio communications section (a2) is in a voice communication state.

The serial asynchronous communications circuit (a106) establishes communication with the interface (a3) and the information processing section (a4).

The serial signal (a131) corresponds to data for controlling the human-machine interface function with respect to the radio communications section (a2) and data for controlling the modem function of the interface (a3).

The interface (a3) comprises a microprocessor (a31), memory (a32), the serial synchronous communications circuit (a3), a parallel communications circuit (a34), and a power supply circuit. The interface (a3) fulfills a modem function for modulating and demodulating e-mail data or fax data, and a data communications function for transmitting control command data used by the information processing section (a4) for controlling the radio communications section (a2). The modem function signifies encoding and compression of transmission data and decoding and expansion of received data.

The microprocessor (a31) performs processing for effecting the modem function according to the program stored in the memory (a32).

The serial synchronous communications circuit (a33) exchanges non-audio data, such as fax data or e-mail data, with the radio communications section (a2) through use of the serial data (a141 and a142).

The parallel communications circuit (a34) sends and receives the control data, which is exchanged between the interface (a3) and the information processing section (a4), and non-audio data to and from the information processing section (a4) through use of parallel data (a144).

The non-audio data received by the serial synchronous communications circuit (a33) are read by the microprocessor (a31) and are subjected to decoding, expansion, and error detection processing steps. Subsequently, the thus-processed non-audio data are transmitted to the information processing section (a4) by means of the parallel communications circuit (a34). In contrast, the non-audio data received by the parallel communications circuit (a34) are read by the microprocessor (a31) and are subjected to compression and encoding steps. Subsequently, the thus-processed non-audio data are transmitted to the radio communications section (a2) by means of the serial synchronous communications circuit (a3).

With respect to the radio communications section (a2), the serial synchronous communications circuit (a36) exchanges command data for controlling the modem function.

A serial branch circuit (a37) switches between a serial signal for use as the human-machine interface control command data exchanged between the information processing section (a4) and the radio communications section (a2), and a serial signal for use as the command data exchanged between the radio communications section (a2) and the interface (a3). When an interface deactivation signal (a431) is high, the serial branch circuit (a37) connects the serial signal (a131) to the serial signal (a132). In contrast, when the interface deactivation signal (a431) is low, the serial branch circuit (a37) connects the serial signal (a131) to a serial signal (a361).

The transmission timing signal (a120) is input to a "hold" control terminal of the microprocessor (a31). When the transmission timing signal (a120) is high, the microprocessor (a31) enters a "hold" state, thereby deactivating all the functions of the interface (a3) except the function of the serial branch circuit (a37).

The interface deactivation signal (a431) is input to a "stop" control terminal of the microprocessor (a31). When the interface deactivation signal (a431) is high, the microprocessor (a31) is reset.

The receipt timing signal (a119) is connected to an interrupt control terminal of the microprocessor (a31) and informs the microprocessor (a31) of the timing at which non-audio data are exchanged between the interface (a3) and the radio communications section (a2) and between the interface (a3) and the information processing section (a4).

The information processing section (a4) comprises a microprocessor (a41), memory (a42), a serial asynchronous communications circuit (a44), a parallel communications circuit (a45), an I/O circuit (a43), an RTC circuit (a47), a character input detection circuit (a46), the character input section (a7), and the display section (a6).

The microprocessor (a41) performs predetermined processing operations according to the program stored in the memory (a42). The memory (a42) comprises program memory and data memory for storing data. The I/O circuit (a43) controls input and output of signals according to an instruction issued by the microprocessor (a41). The I/O circuit (a43) receives character input information (a461) output from the character input detection circuit (a46) and the receipt timing signal (a119), and outputs the interface deactivation signal (a431) and display data (a432) to be delivered to the display section (a6).

The serial asynchronous circuit (a44) sends to and receives from the radio communications section (a2), the data used for controlling a human-machine interface for the radio communications section (a2). The parallel communications circuit (a45) exchanges non-audio data with respect to the interface (a3) through use of the parallel data (a144) and sends to and receives from the interface (a3) the control data exchanged between the interface (a3) and the information processing section (a4).

The character input detection circuit (a46) outputs a scan signal (a462) to the character input section (a7). When characters are input to the character input section (a7) by means of the scan signal (a462), the character input detection section circuit (a46) retains the character input information (a463) in a register provided within the character input detection circuit (a46) and outputs the data stored in the register as character input information (a461). Further, the character input detection circuit (a46) informs the microprocessor (a41) of entry of characters, through use of an interrupt signal (a464). The microprocessor (a41) reads the character input information (a461) byway of the I/O circuit (a43). Further, upon detection of entry of characters, the character input detection circuit (a46) outputs a character input detection pulse signal (a465).

The RTC circuit (a47) is a real-time clock having a clock function, and a time can be set on the RTC circuit (a47) by means of the microprocessor (a41). Even when he microprocessor (a41) is deactivated, the RTC circuit (a47) can operate by means of an oscillator (a471). Further, the RTC circuit (a47) outputs a microprocessor deactivation signal (a472), which becomes high if the character input detection pulse signal (a465) is not input during a predetermined time period set by the microprocessor (a41). If the character input detection pulse signal (a465) is input after the microprocessor deactivation signal (a472) has become high, the microprocessor deactivation signal (a472) becomes immediately low.

An AND circuit (a49) and an OR circuit (a48) deactivate the microprocessor (a41). The AND circuit (a49) produces an AND result of the microprocessor deactivation signal (a472) and the output signal (a116) and outputs the result as a signal (a491). Specifically, the output signal (a491) becomes high on the premise that the radio communications section is in a voice communication state and that information is not input to the information processing section for a given period of time.

The OR circuit (a48) produces an exclusive OR result of the output signal (a491) and the transmission timing signal (a120) and outputs a microprocessor deactivation signal (a481). The microprocessor deactivation signal (a481) becomes high on the premise that the radio communications section is in a voice communication state and information is not input to the information processing section for a given period of time, or on the premise that the transmission timing signal is high (i.e., transmission is in progress).

The microprocessor deactivation signal (a481) is input to the "hold" control terminal of the microprocessor (a41). When the microprocessor deactivation signal (a481) is high, the microprocessor (a41) enters a "hold" state, thereby deactivating all the functions of the information processing section (a4) except the function of the RTC circuit (a47).

The voltage output from the secondary battery (a8) is supplied to unillustrated, respective power supply circuits of the radio communications section (a2), the interface (a3), and the information processing section (a4).

The operation of the terminal (a') having the foregoing configuration will now be described by reference to FIGS. 1 and 2.

The character data input by way of the character input section (a7) are read by the microprocessor (a41) by way of the character input detection circuit (a46) and the I/O circuit (a43) and are edited into text data. The thus-edited text data are then stored in the memory (a42). When the thus-stored text data are transmitted in the form of an e-mail message, control commands (i.e., a call origination command and an e-mail transmission command) used for bringing the radio communications section (a2) into a communication state are transmitted to the radio communications section (a2) by way of the serial asynchronous circuit (a44). Upon receipt of the control commands (i.e., the call origination command), the radio communications section (a2) originates a call and establishes a communication line with the network. At this time, the network reports to the radio communications section (a2) the designation of a mode in which non-telephone communication is conducted.

The radio communications section (a2) transmits a call origination completion notice to the information processing section (a4) by way of the serial asynchronous communications circuit (a106). Upon receipt of the call origination completion notice, the microprocessor (a41) of the information processing section (a4) brings the interface deactivation signal (a431) into a low level by way of the I/O circuit (a43), thereby releasing the microprocessor (a31) of the interface (a3) from are set state. As a result, the microprocessor (a31) becomes operative. At this time, the microprocessor (a31) sends an inquiry about the mode of the modem function to the radio communications section (a2) by way of the serial asynchronous circuit (a36). In response to the inquiry, the radio communications section (a2) reports the mode reported by the network to the interface (a3). The microprocessor (a31) of the interface (a3) sets the modem function thereof to the mode reported by the radio communications section (a2).

By way of the parallel communications circuit (a45), the microprocessor (a41) of the information processing section (a4) sends to the interface (a3) an inquiry as to whether or not the text data can be transmitted.

If setting of mode of the modem function has been completed, by way of the parallel communications circuit (a34) the microprocessor (a31) of the interface (a3) authorizes the information processing section (a4) to transmit the text data.

After receipt of the transmission authorization, the microprocessor (a41) of the information processing section (a4) transmits the text data to the interface (a3) by way of the parallel communications circuit (a45).

The text data transmitted to the interface (a3) is transmitted to the network by way of the parallel communications circuit (a34), the encoding section of the microprocessor (a31), the serial synchronous communication circuit (a33), the serial data (a142), the serial synchronization circuit (a108), the transmission non-audio data (a118), the modem circuit (a103), the modulated digital signal (a144), the radio circuit (a9), and the antenna (a1).

Receipt of an e-mail message involves the same procedures as those required by transmission of an e-mail message, in terms of the steps from line connection to setting of the mode of the modem function. By way of the serial synchronous communications circuit (a106), the microprocessor (a101) of the radio communications section (a2) sends to the interface (a3) an inquiry as to whether or not the interface (a3) can receive an e-mail message.

If setting of mode of the modem function has already been completed, the microprocessor (a31) of the interface (a3) reports to the radio communications section (a2) an e-mail receipt authorization by way of the serial asynchronous communications circuit (a36). Further, by way of the parallel communications circuit (a34), the microprocessor (a31) informs the information processing section (a4) that the interface (a3) can receive an e-mail message.

After receipt of the receipt authorization, the microprocessor (a101) of the radio communications section (a2) commences receipt of an e-mail message from the network. The thus-received data are transferred to the information processing section (a4) by way of the antenna (a1), the radio circuit (a9), the received signal (a111), the modem circuit (a103), the demodulated data (a117), the serial synchronous communications circuit (a108), the serial data (a141), the serial synchronous communications circuit (a33), a decoding section of the microprocessor (a31), the parallel communications section (a34), and the parallel data (a144).

The microprocessor (a41) of the information processing section (a4) edits the e-mail data, which are received by way of the parallel communications circuit (a45), into text data and temporarily stores the text data into the memory (a42). The thus-stored received e-mail message can be indicated on the display section (a6) by means of the operation entered by way of the character input section (a7).

Figure 2:
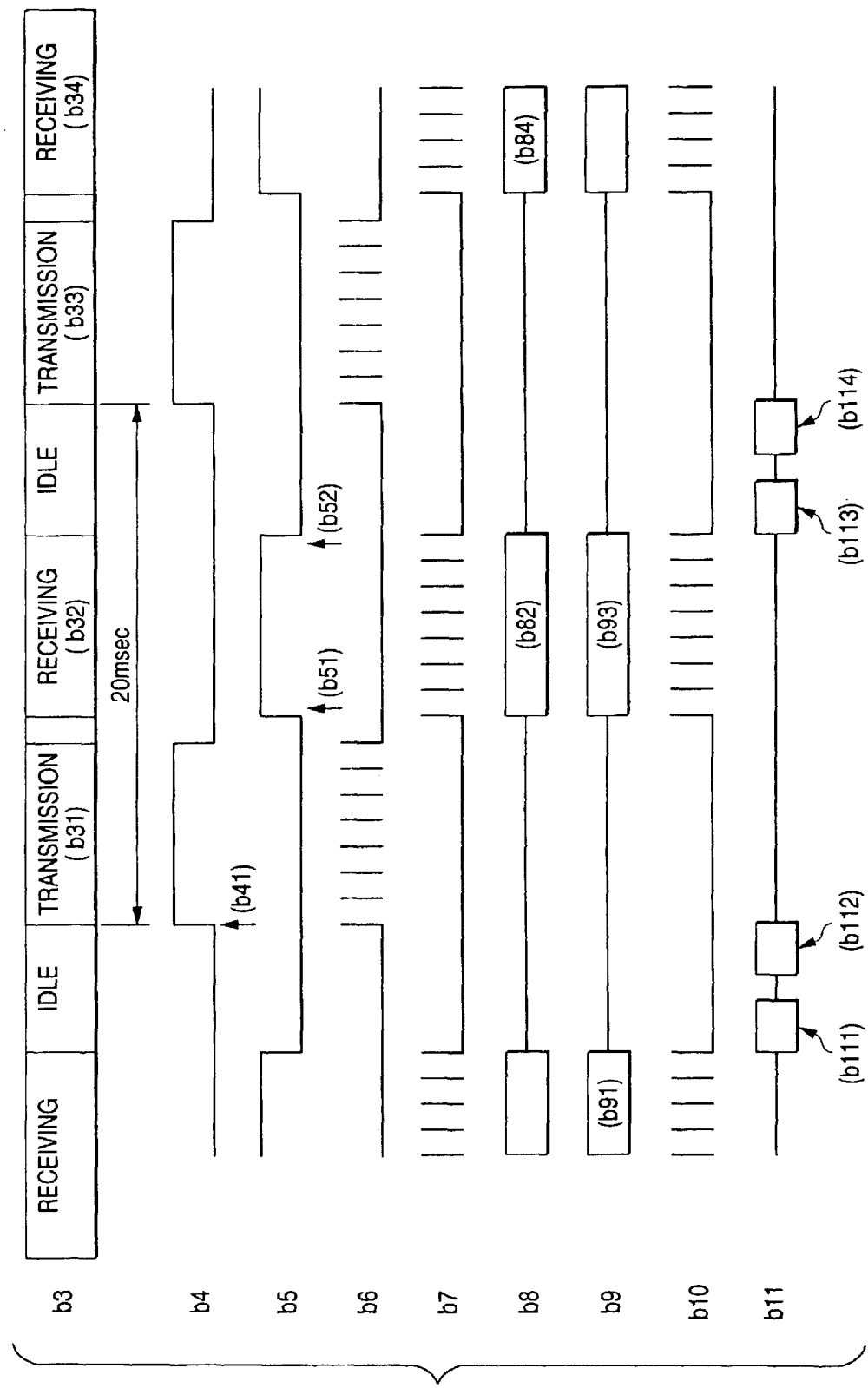
FIG. 2 is a timing chart for describing the operation of the portable information terminal according to the embodiment.
Figure 3:
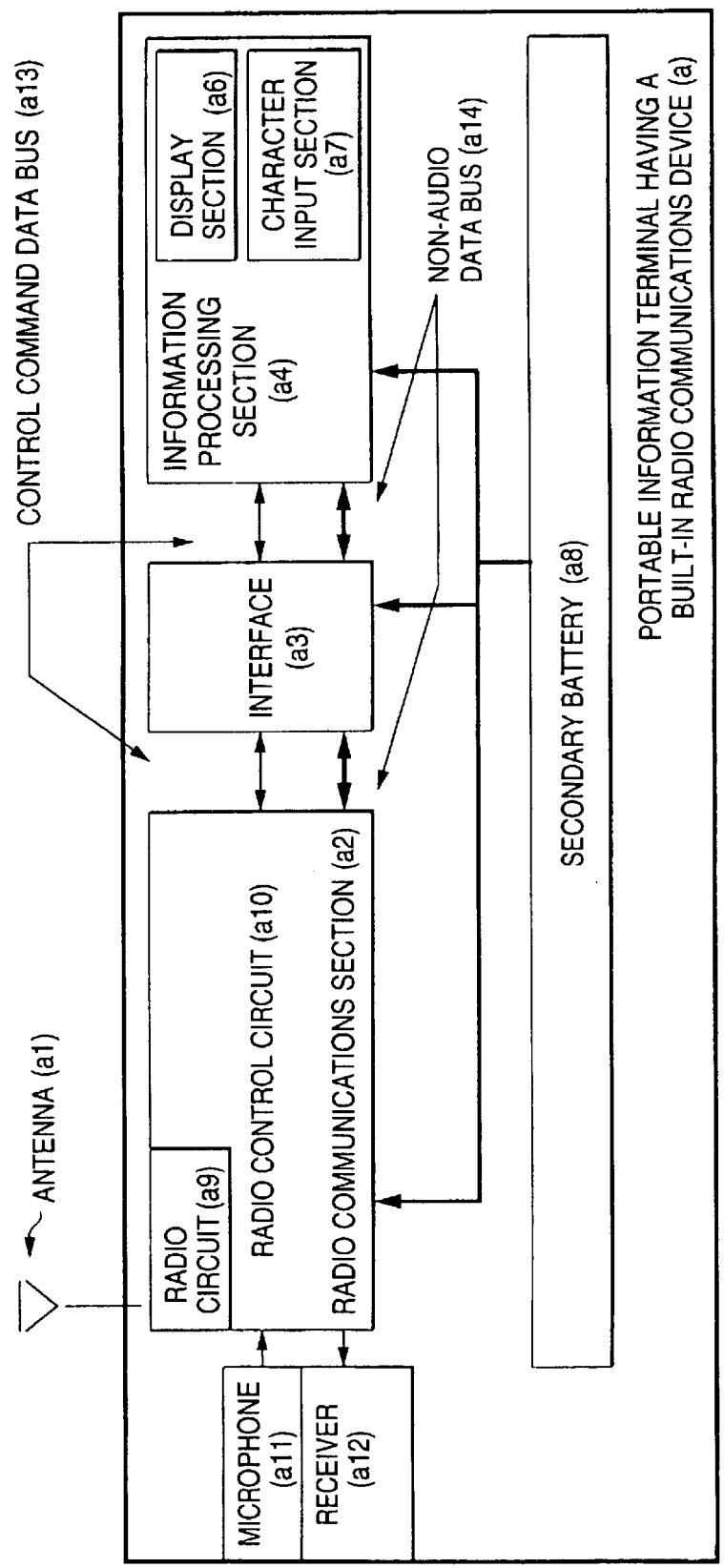
FIG. 3 is a circuit diagram showing the configuration of a conventional portable information terminal having a built-in radio communications device.
Figure 4:
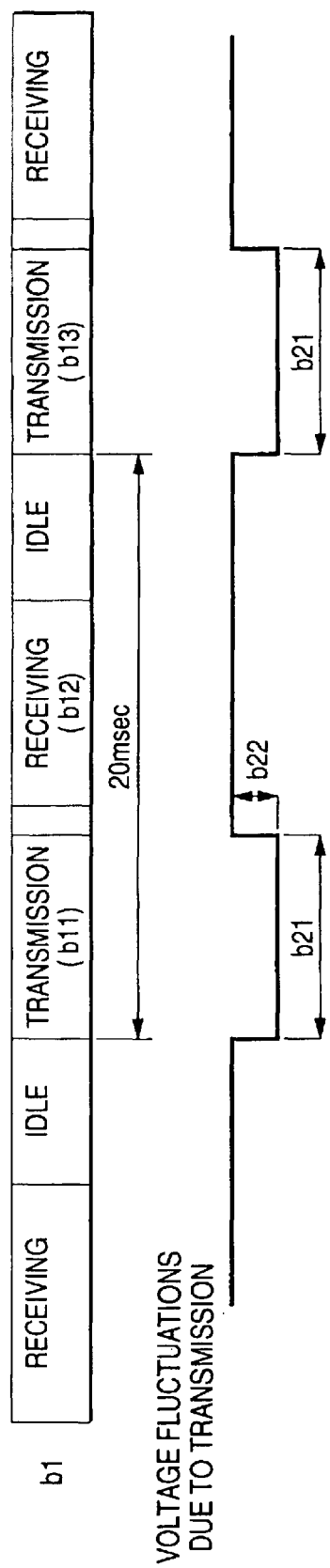
FIG. 4 is a chart showing the relationship between timings of TDMA and voltage fluctuations according to the conventional art.

Timing chart b3 shown in FIG. 2 designates a timing at which TDMA signals are transmitted and received. The interval between a transmission time slot (b31) and another transmission time slot (b33) and the interval between a receipt time slot (b32) and another receipt time slot (b34) each assume a value of 20 msec. Thus, receipt and transmission operations are carried out through use of the time division technique.

Timing chart b4 designates the transmission timing signal (a12). When the timing chart (b4) is high, the microprocessor (a31) of the interface (a3) and the microprocessor (a41) of the information processing section (a4) are brought into a hold state. Accordingly, the interface (a3) and the information processing section (a4) are deactivated, and only the radio communications section (a2) dissipates electric current. When the timing chart b4 returns to a low level, the microprocessors (a31) and (a41) are restored to an operating condition from the "hold" state.

The serial synchronous transmission circuit (a108) of the radio communications section (a2) sends the data stored in the transmission register provided within the serial synchronous communications circuit (a108), at the timing of a leading edge (b41) of a timing chart b4.

A timing chart b5 designates the receipt timing signal (a119). The microprocessor (a31) of the interface (a3) perceives, from an leading edge interrupt (b51) appearing in the timing chart b5, the timing at which non-audio data are exchanged between the interface (a3) and the radio communications section (a2). Further, from a trailing edge interrupt (b52) appearing in the timing chart b5, the interface (a3) perceives the timing at which non-audio data are exchanged between the interface (a3) and the information processing section (a4).

The microprocessor (a41) of the information processing section (a4) monitors changes in the receipt timing signal (a119) by way of the I/O circuit (a43) and perceives, from a shift in the voltage from a high level to a low level, the timing at which non-audio data are exchanged between the interface (a3) and the information processing section (a4).

Timing chart b6 designates the timing of the transmission non-audio data (a118); timing chart b7 designates the timing of the demodulated data (a117); timing chart b8 designates the timing of the serial data (a141); timing chart b9 designates the timing of the serial data (a142); and timing chart b10 designates the timing of the synchronization clock signal (a143). Serial data (b82) are received during the receipt time slot (b32), and serial data (b84) are received during the receipt time slot (b34). Further, serial data (b91) are transmitted during the transmission time slot (b31), and serial data (b93) are transmitted during the transmission time slot (b33).

The timing chart (b11) designates the timing at which data are exchanged between the interface (a3) and the information processing section (a4).

Data are transferred to the information processing section (a4) from the interface (a3) at timings (b111) and (b113), whereas data are transferred to the interface (a3) from the information processing section (a4) at timings (b112) and (b114). The data exchanged at these timings correspond to the non-audio data, as well as to the control data which are exchanged between the interface (a3) and the information processing section (a4).

As mentioned previously, there is embodied the means capable of exchanging data between the information processing section (a4) and the radio communications section (a2) while a non-transmission state is in effect, even when the interface (a3) and the information processing section (a4) are deactivated by means of the transmission timing signal (a120).

As mentioned above, according to the present embodiment, a portable information terminal having a built-in radio communications device is configured so as to deactivate an information processing section and an interface when a radio communications section is in a transmission state, to activate the information processing section and the interface when the radio communications section is in a non-transmission state, and to deactivate the information processing section and the interface section while the radio communications section is in a voice communication state and information is not input to the information processing section for a given period of time. As a result, the portable information terminal having a built-in radio communications device can operate for a long period of time by distributing or diminishing the electric current dissipated by operation, in accordance with operating conditions.

As has been described above, the portable information terminal having a built-in radio communications device according to the present invention is provided with means for bringing the respective microprocessors of the interface and the information processing section into a hold state, according to the transmission timing signal, thereby deactivating the interface and the information processing section. As a result, the operating current required during transmission can be minimized. Consequently, there is yielded an advantage of diminishing the operation threshold voltage of the portable information terminal.

What is claimed is:

1. A portable information terminal having a built-in radio communications device, including
a radio communications section for performing transmission and receipt operations through use of a time-division technique,
an information processing section for receiving, processing, storing, and outputting information, an interface which electrically connects the radio communications section to the information processing section and exchange information therebetween, and a battery for supplying power to the radio communications section, the information processing section, and the interface, wherein the portable information terminal is characterized by comprising means for deactivating the information processing section and the interface when the radio communications section is in a transmission state.

2. The portable information terminal as defined in claim 1, further comprises means for controlling the radio communications section and the information processing section so as to exchange information therebetween only while the radio communications section is in a non-transmission state.

3. The portable information terminal as defined in claim 1, wherein the radio communications section has a function of exchanging audio data or non-audio data with respect to a network; and further comprises means for deactivating the information processing section and the interface while the radio communications section is in a voice communication state and information is not input to the information processing section for a given period of time.

* * * * *